J. T. HUGHES.
STEERING AND BRAKING DEVICE FOR AEROPLANES.
APPLICATION FILED AUG. 10, 1920.
1,378,233.
Patented May 17, 1921.
2 SHEETS—SHEET 1.
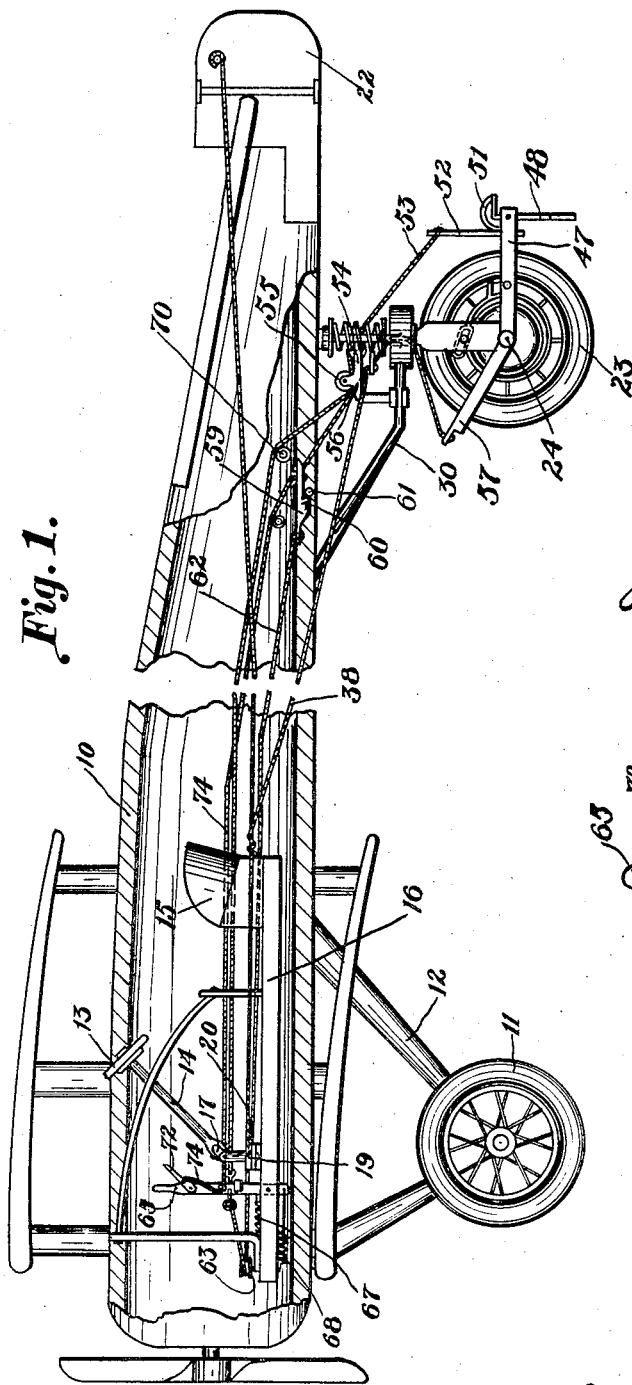
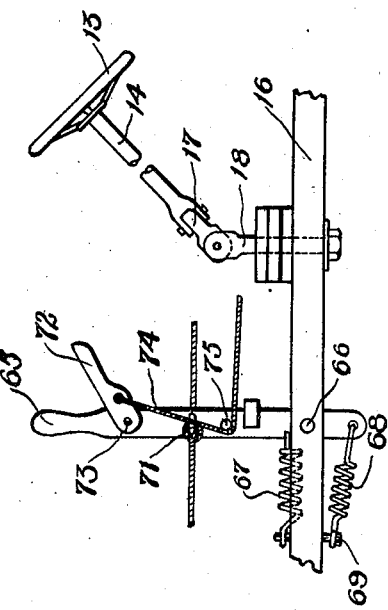
Inventor
J. T. Hughes.
By Arthur H. Sturges.
Attorney

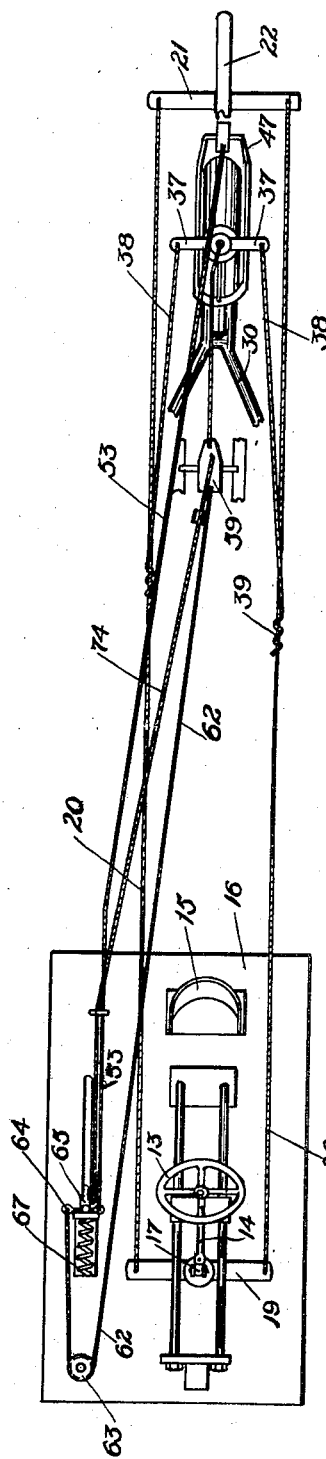
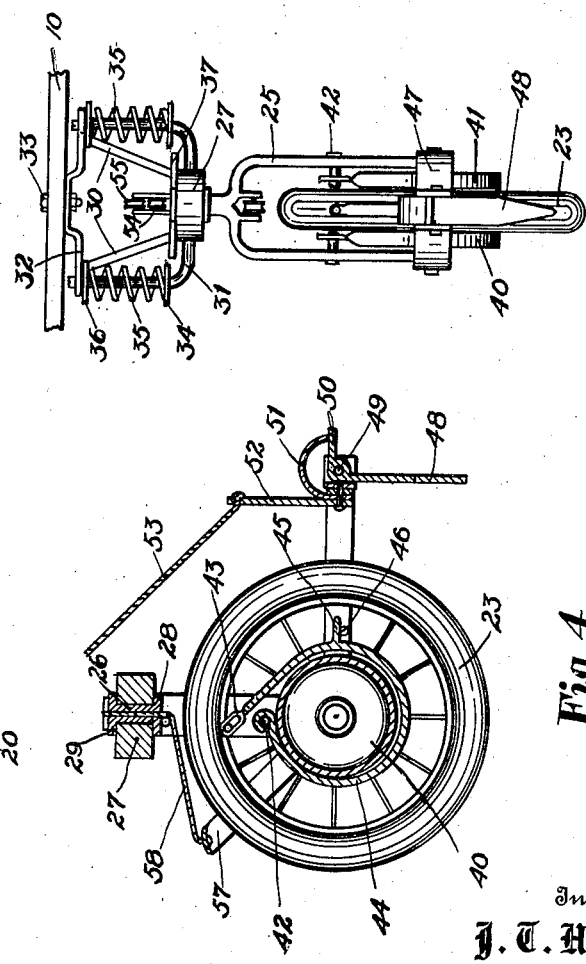
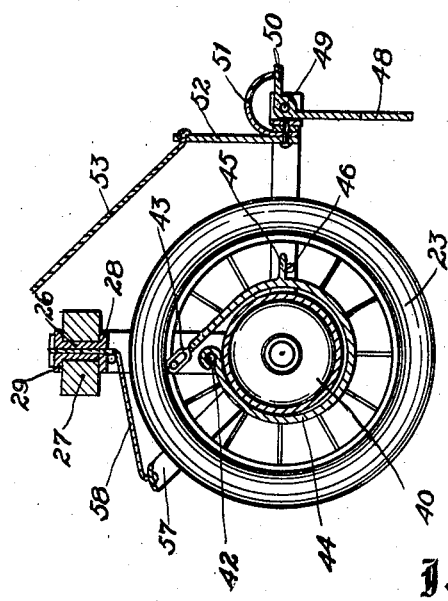

UNITED STATES PATENT OFFICE.

JOHN THOMAS HUGHES, OF COUNCIL BLUFFS, IOWA.

STEERING AND BRAKING DEVICE FOR AEROPLANES.

1,378,233.      Specification of Letters Patent.      Patented May 17, 1921.

Application filed August 10, 1920. Serial No. 402,721.

*To all whom it may concern:*

Be it known that I, JOHN T. HUGHES, a citizen of the United States, residing at Council Bluffs, in the county of Pottawattamie and State of Iowa, have invented certain new and useful Improvements in Steering and Braking Devices for Aeroplanes, of which the following is a specification.

The present invention relates to improvements in aeroplanes, and it more specifically refers to a rear swivel wheel adapted to be utilized for purposes of steering, and the invention further contemplates the provision of braking means associated with such steering wheel.

An object of the invention is to provide, in combination with the usual landing wheels of an aeroplane attached in the usual manner to the running gear thereof at the forward end of the plane, a rear swivel wheel adapted to be connected to the steering apparatus so that the rear wheel may be swung on a vertical axis to guide the plane when moving on the ground.

A further object of the invention lies in providing an improved aeroplane steering apparatus in which there is also combined a braking apparatus operated from the seat of the aeronaut.

A still further object of the invention resides in providing an improved aeroplane in which a resiliently mounted anchor is associated with the rear steering wheel and is provided with connections operable from the platform or fuselage of the aeroplane so as to act as an emergency brake in case it is desired to suddenly check the speed of the plane after alighting as when the field is short and trees or other obstructions are encountered.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of the aeroplane, parts being shown in section having an improved apparatus embodied thereon as constructed in accordance with the present invention;

Fig. 2 is an enlarged fragmentary detail of the steering and brake controlling apparatus;

Fig. 3 is a plan view of the aeroplane platform showing the connections to the rudder and steering mechanism;

Fig. 4 is an enlarged side view with parts shown in section of the rear steering wheel and the braking apparatus; and Fig. 5 is a rear view of the steering wheel and its mounting.

Referring more particularly to the drawings, 10 designates an aeroplane of a conventional form supplied with the usual mechanism for driving and controlling the same. The landing wheels are represented at 11 and are provided on the usual running gear 12 at the forward end of the plane. The steering wheel 13 is in the usual manner carried on a steering post 14 which lies at a suitable position for convenient operation by the aviator who occupies the seat 15. These various parts are carried on a platform 16 mounted in the body 10 of the aeroplane.

At the base of the steering column 14 is provided a universal joint 17 by which the steering column is coupled to a vertically disposed bolt 18 mounted through the platform 16. The bolt carries a cross piece 19 shown to better advantage in Fig. 1, the arrangement being such that the cross piece 19 is oscillated with the steering wheel 13.

A pair of cables 20 connect with the opposite ends of the cross piece 19 and extend rearwardly to the usual cross piece 21 of the rudder 22. The steering wheel 13 therefore affords the usual means of directing the course of the aeroplane when aloft. The rear landing wheel 23 forming the present invention is journaled on a shaft 24 supported in a fork 25 at the upper end of which is a stud post 26 rotatably fitted within a stationary collar 27, the post being flanged as indicated at 28 and 29 to retain the same in said collar.

The collar is supported by a pair of diverging braces 30 which, as shown in Fig. 1, are secured in any suitable manner beneath the framework 10 of the aeroplane and which may be brazed or otherwise secured to the collar 27 at its forward portion. The collar 27 is also a source of support for the pair of rods 31 which extend laterally and upwardly from the collar and are let at their upper ends through perforations in the offset portions of a yoke piece 32 bolted as indicated at 33 to a portion of the aeroplane 10.

Flanges 34 are secured on the rods 31 near their lower ends in order to receive the lower ends of coil springs 35 which are wound about the rods and engage at their upper ends against the yoke 32 or suitable washers 36 interposed therebetween. The rods 31 have a sliding movement through the offset parts of the yoke piece 32 so that, when the wheel 23 meets with inequalities in the surface of the field over which the aeroplane is moving, the wheel mounting comprising the fork 25 and other connected parts may yield upwardly, the springs 35 being compressed. After the inequality is passed, the springs 35 will again become distended and restore the parts to their normal positions.

The post 26 is provided with a cross piece 37 just above the collar 27 to which are attached the cords 38. These cords extend forwardly and upwardly and are coupled to the cables 20 as indicated at 39, so that the turning of the wheel 23 will be simultaneous with the operation of the rudder 22 and the movements of both will be accomplished from the steering wheel 13.

At opposite sides of the wheel 23 and mounted to turn therewith are a pair of brake drums 40 about which are fitted flexible brake bands 41 which are secured each at one end by a stud 42 held in the fork 25. The other end of each brake band is coupled to a slotted link 43 which engages loosely about a pin 44 also carried by the fork 25. The slotted link allows the necessary play in the band 41. These brake bands 41 also carry projections 45 operating in the paths of lugs 46 which extend inwardly from arms 47 pivoted about the axle 24 and having their rear ends separated by an anchor 48 pivoted in such arms as indicated at 49 and provided with a right angled extension or tail piece 50 engaged by a bow spring 51 secured to the arms 47 in any suitable manner. The bow spring normally retains the anchor in the position indicated in Fig. 4.

A post 52 extends upwardly from the rear ends of the arms 47 and provides convenient means to which to attach a cable 53. This cable passes above a pulley 54 and beneath a second pulley 55 held on a framework 56 which is clamped or otherwise secured to the brace rods 30. The arms 47 also carry extension pieces 57 lying forwardly of the axle 24 and preferably extending diagonally.

The upper ends of the extension pieces 57 are connected to a cable 58 which passes up through a central perforation in the post 26. The cable 58 passes upwardly to a block 59 to which it is secured. The block is provided on its lower side with a hook 60 adapted to engage a pin 61 on the aeroplane framework. A cable 62 is connected to the block and extends forwardly to the front portion of the platform 16 where it engages about a pulley 63 and thence extends rearwardly to an eye 64 to which it is affixed. The eye is carried by a lever 65 pivoted at 66 in the platform 16 and having a pair of coil springs 67 and 68 coupled thereto respectively above and below the pivot point 66.

A bolt 69 passing through the platform 16 serves to hold the other ends of said coil springs. The cable 53, after passing beneath the roller 55 passes about a further roller 70 and thence extends forwardly to a second eye 71 on the lever 65. The lever also carries a pivot gripping handle 72 fulcrumed at 73 and having connection to a cable 74 that extends about a pulley 75 toward the lower portion of the lever 65. The cable is then directed rearwardly to the block 59.

In operation, the aeroplane is steered in the usual manner by turning the wheel 13 which causes the cables 20 to be respectively drawn upon and released so that the rudder 22 may be swung back and forth about its vertical axis. While the aeroplane is resting on the ground wheels 11 and 23 this movement of the steering wheel will also act to better direct the aeroplane inasmuch as the rudder, itself, is not entirely depended upon as is now a present practice, but the wheel 23 coming in contact with the ground will actively exert a more positive steering effect. This steering of the wheel 23 is accomplished through the cables 38 which are directly connected with the cables 20.

The wheel 23 also provides for braking the aeroplane which may be done by causing the tightening of the bands 41 about the drums 40. This is accomplished by exerting a pull upon the cable 53 which is connected in the eye 71 of the lever 65. This latter lever is placed forwardly of the seat 15 where it may be grasped by the operator and swung forwardly about the pivot 66. This will cause the cable 53 to be drawn upon as a consequence of which the arms 47 will be raised and the lugs 46 brought into active contact with the extensions 45 of the brake bands, thus causing the latter to grip upon the drums 40.

When the lever 65 is thus swung it will place the lower springs 68 under a condition of tension which will assist to restore the lever 65 to its original position. Should a more positive brake be required, as, for instance, to quickly arrest the movement of the aeroplane in a short field where trees are about to be encountered, the lever 65 may be swung in a rear direction to exert a pull upon the cable 58 which will result in the raising of the extension pieces 57 and the consequent swinging of the arms 47 downwardly.

This movement brings the anchor 48 into contact with the ground which actively arrests the movement of the aeroplane. The anchor 48 is pivoted and yieldingly held in this position so that it may be swung rearwardly about its pivot point 49 when obstacles are met which would otherwise cause the breaking of the anchor. In throwing the anchor into contact with the ground the block 59 is pulled forwardly and engaged with its hook 60 in contact with the pin 61 so that the anchor may be left automatically in operative position. When, however, it is desired to release the same the hand grip 72 is squeezed so as to exert a pull upon the cable 74 thus lifting the block 59 and causing its hook 60 to be released from engagement with the pin 61 whereupon the parts will return to their normal positions.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. In combination with an aeroplane having the usual steering apparatus, of a resiliently supported landing wheel mounted to turn about a substantially vertical axis, connections between such steering mechanism and the ground wheel for turning the same about such axis, braking means associated with such wheel, further braking means adapted to come in contact with the ground, and a common means on the aeroplane for controlling both of said braking means.

2. In combination with an aeroplane having the usual steering apparatus, of a resiliently supported landing wheel adapted to turn about a substantially vertical axis, connections between the steering means and said wheel, brake drums associated with said wheel, brake bands fitted about said drums, means to bind said bands on said drums, a resiliently supported landing anchor normally held out of contact with the ground, and a common means on the aeroplane for tightening the brake bands and for projecting said anchor into contact with the ground.

3. In combination with an aeroplane, a landing wheel, a landing anchor associated therewith and normally held out of contact with the ground, means on the aeroplane for shifting said anchor into contact with the ground, means for holding said last named means in operative position, and means whereby said holding means may be released.

In testimony whereof, I have affixed my signature in presence of two witnesses.

JOHN THOMAS HUGHES.

Witnesses:
 E. C. STURGES,
 ARTHUR H. STURGES.